(12) United States Patent
Ueyoko

(10) Patent No.: US 6,752,186 B1
(45) Date of Patent: Jun. 22, 2004

(54) PNEUMATIC TIRE

(75) Inventor: Kiyoshi Ueyoko, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 09/692,699

(22) Filed: Oct. 20, 2000

(30) Foreign Application Priority Data

Oct. 21, 1999 (JP) ............................................ 11-299964

(51) Int. Cl.$^7$ ............................ B60C 3/00; B60C 15/00
(52) U.S. Cl. ....................... 152/454; 152/539; 152/552; 152/554
(58) Field of Search ................................ 152/454, 539, 152/552, 554, 523, 525

(56) References Cited

U.S. PATENT DOCUMENTS

| | | | | |
|---|---|---|---|---|
| 4,446,902 A | * | 5/1984 | Madec et al. | .......... 152/209.12 |
| 4,917,164 A | * | 4/1990 | Ushikubo et al. | ........... 152/517 |
| 4,947,913 A | | 8/1990 | Kaba et al. | |
| 5,772,811 A | * | 6/1998 | Ueyoko et al. | ............. 152/540 |

FOREIGN PATENT DOCUMENTS

| | | |
|---|---|---|
| EP | 0491575 A | 6/1992 |
| EP | 0853008 A | 7/1998 |

* cited by examiner

Primary Examiner—Jeff H. Aftergut
Assistant Examiner—Justin Fischer
(74) Attorney, Agent, or Firm—Birch, Stewart, Kolasch & Birch, LLP

(57) ABSTRACT

A pneumatic tire comprises a carcass ply turned up around a bead core in each bead portion to form a pair of turnup portions and a main portion therebetween, and a rubber bead apex disposed between each turnup portion and main portion. Each turnup portion extends radially outwardly beyond a radially outer end of the bead apex to have a part adjoining the main portion. The profile in a tire sidewall portion and bead portion comprises a first linear portion and a second linear portion, the first linear portion extending radially outwards from a point P in substantially parallel to the tire equatorial plane, and the second linear portion extending radially inwards from the point P while inclining axially inwards at an angle of from +15 to +60 degrees with respect to the tire equatorial plane. The radial distance of the radially outer end of the turnup portion from a point Q is in the range of less than 3 times a distance (gt) measured from the point P to the carcass ply main portion along a straight line drawn from the point P perpendicularly to the carcass ply main portion, wherein the point Q is defined as a point at which the straight line intersects the carcass ply main portion.

8 Claims, 8 Drawing Sheets

Fig.6
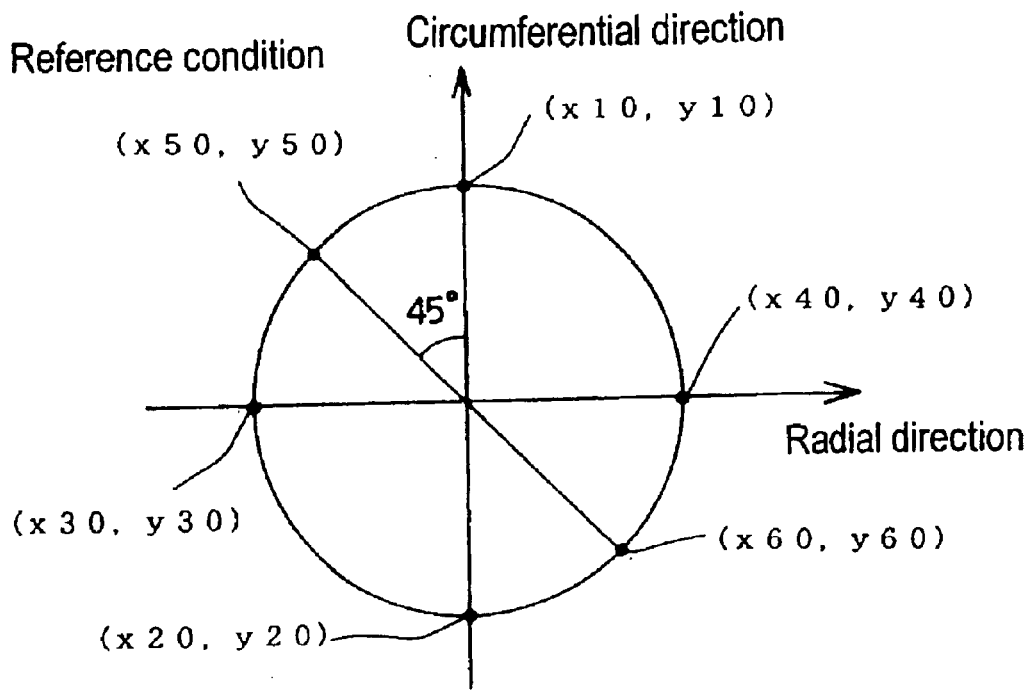
(A) Reference condition
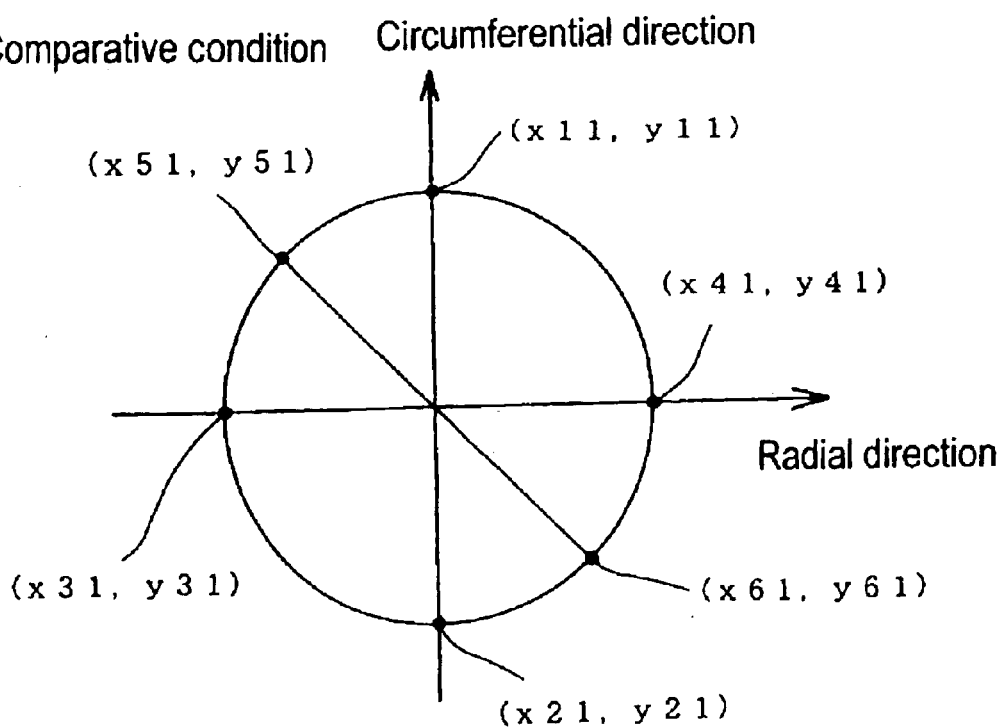
(B) Comparative condition

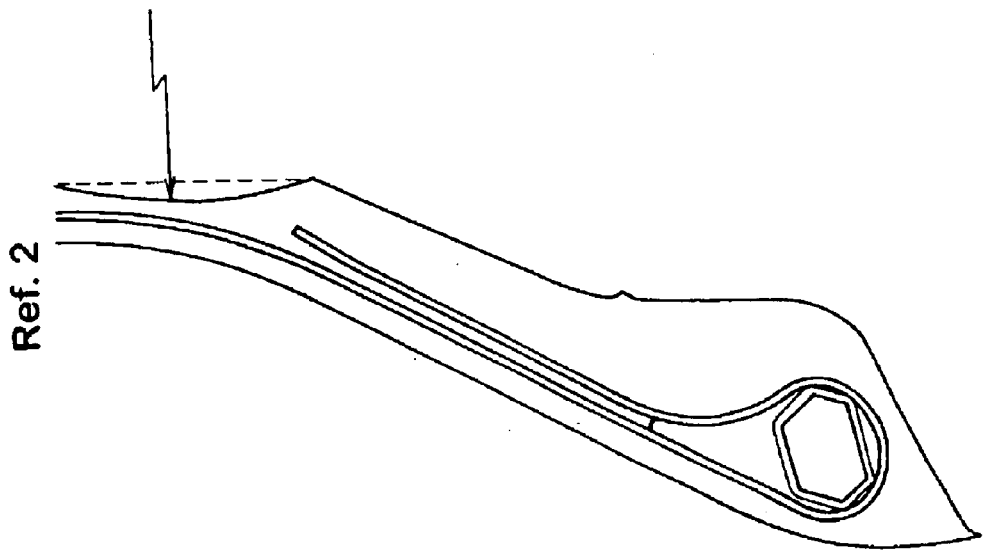
Fig.9 Ref. 2
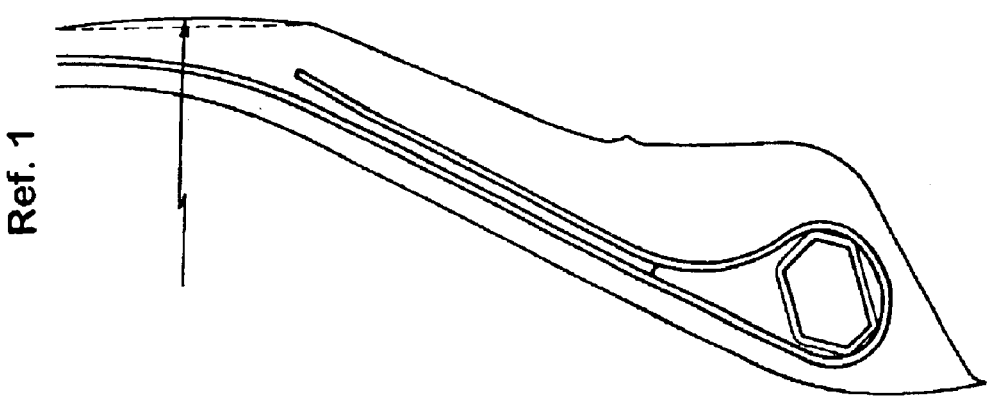
Fig.8 Ref. 1
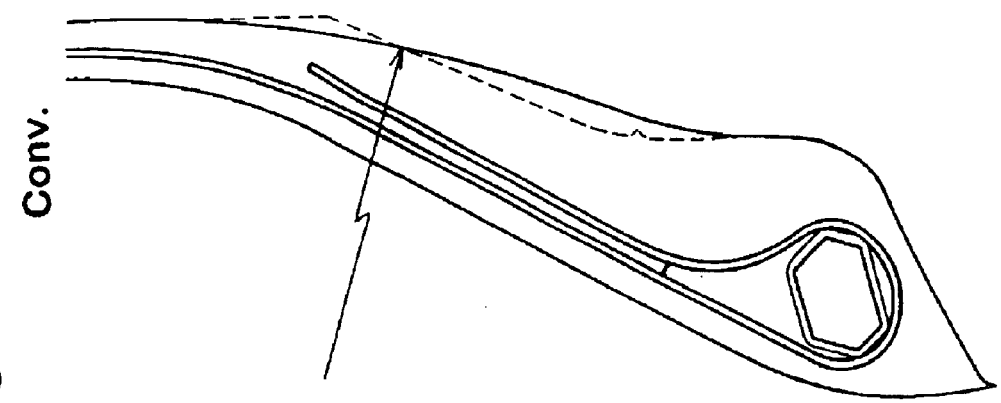
Fig.7 Conv.

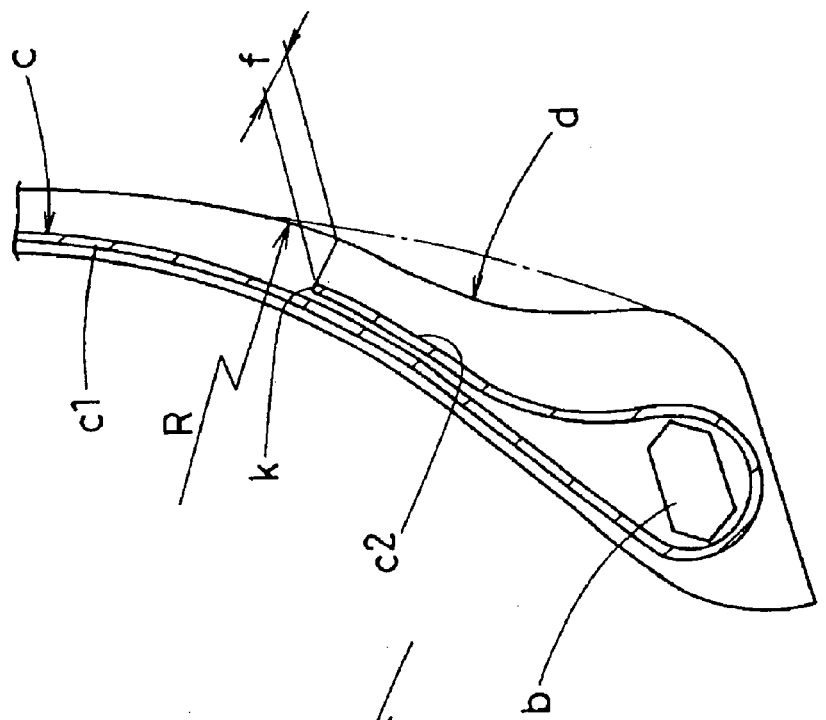
Fig. 12 Prior Art
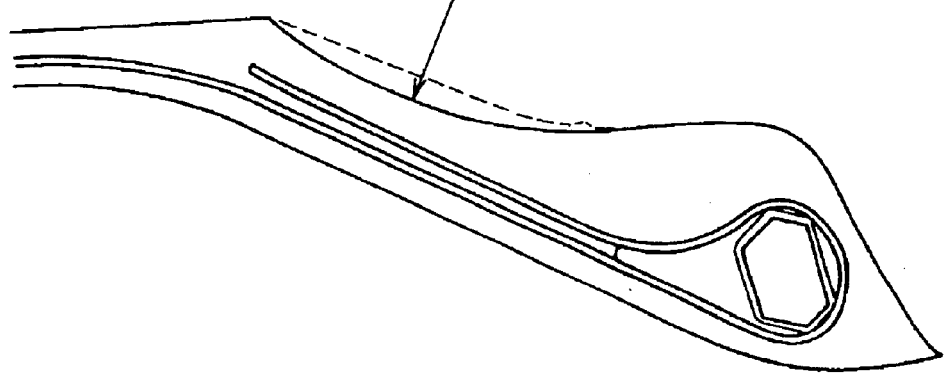
Fig. 11 Ref. 8
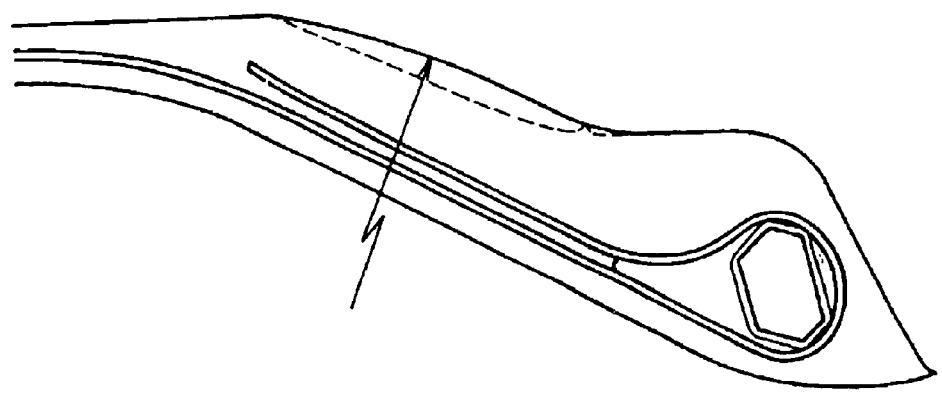
Fig. 10 Ref. 7

PNEUMATIC TIRE

The present invention relates to a pneumatic tire more particularly to a structure of the bead portion and lower sidewall portion being capable of improving the durability.

In Japanese patent Nos.2837840 and 2863510, the present inventor disclosed pneumatic tires improved in bead durability. In such tires, in order to reduce the tire weight as shown in FIG. 12, the carcass is composed of a single ply (c) having a toroidal main portion (c1) extending between a pair of bead portions and a turnup portion (c2) turned up around each bead core (b) from the axially inside to the outside of the tire. And the axial outer surface (d) of the bead portion is concavely curved. As the rubber between the carcass ply turnup portion (c2) and the outer surface (d) of the tire is relatively thin by nature, it is difficult to maintain the necessary rubber thickness (f) at the radially outer end (k) of the turnup portion (c2). If the thickness (f) is too small, stress during running concentrates on the outer end (k) and a separation failure liable to start from this outer end (k). Thus, in manufacturing such tires, the yield tends to lower.

It is therefore, an object of the present invention to provide a pneumatic tire, in which the necessary rubber thickness (f) is easily maintained without lowering the yield.

According to the present invention, a pneumatic tire comprises a tread portion, a pair of sidewall portions, a pair of bead portions each with a bead core therein, a carcass ply of cords extending between the bead portions through a tread portion and sidewall portions and turned up around the bead core in each bead portion from the axially inside to the outside of the tire to form a pair of turnup portions and a main portion therebetween, a radially outwardly tapering rubber bead apex disposed between each of the turnup portions and the main portion, in a meridian section of the tire, the sidewall portion and bead portion on each side of the tire having a profile comprising a first linear portion and a second linear portion each being substantially straight, the first linear portion extending radially outwards from a point P in substantially parallel to the tire equatorial plane, the second linear portion extending radially inwards from the point P while inclining axially inwards at an angle of from +15 to +60 degrees with respect to the tire equatorial plane, each turnup portion extending radially outwardly beyond a radially outer end of the bead apex to form an adjoining part in which carcass cords in the turnup portion adjoin carcass cords in the main portion, a radially outer end of the turnup portion disposed at a radial distance from a point Q which is in a range of less than 3 times a distance (gt) wherein the distance (gt) is defined as measured from the point P to the carcass ply main portion along a straight line drawn from the point P perpendicularly to the carcass ply main portion, and the point Q is defined as a point at which the straight line intersects the carcass ply main portion.

Definitions

A standard inflated condition means that the tire is mounted on a standard wheel rim and inflated to a standard pressure but loaded with no tire load.

The standard wheel rim means the "standard rim" specified in JATMA, the "Measuring Rim" in ETRTO, the "Design Rim" in TRA or the like. The standard pressure means the "maximum air pressure" in JATMA, the "Inflation Pressure" in ETRTO, the maximum pressure given in the "Tire Load Limits at Various Cold Inflation Pressures" table in TRA or the like. In case of passenger car tires, however, 180 kPa is used as the standard pressure.

A standard load means the "maximum load capacity" in JATMA, the "Load Capacity" in ETRTO, the maximum value given in the above-mentioned table in TRA or the like.

A tire section height means the radial distance of the radially outermost point of the tread portion measured from a bead base line under the standard inflated condition.

The bead base line is an axial line drawn at the diameter of the wheel rim.

A maximum tire width point means a point on the outer surface of each sidewall portion at which the cross sectional width of the tire is maximum under the standard inflated condition. In case a part having a certain radial extent shows the maximum cross sectional width, the maximum tire width point is defined by the radially outer end of such part.

A standard free condition means that the tire is not mounted on a wheel rim and held vertically, and measurements under this condition mean those of the uppermost part of the tire.

An embodiment of the present invention will now be described in detail in conjunction with the accompanying drawings.

FIGS. 5 and 6 are diagrams for explaining a method of measuring a maximum principal strain on the outer surface of the tire.

FIGS. 7 to 11 are cross sectional views showing bead portions of test tires used in comparison tests.

FIG. 12 is a cross sectional view showing a prior art.

Figure 1:
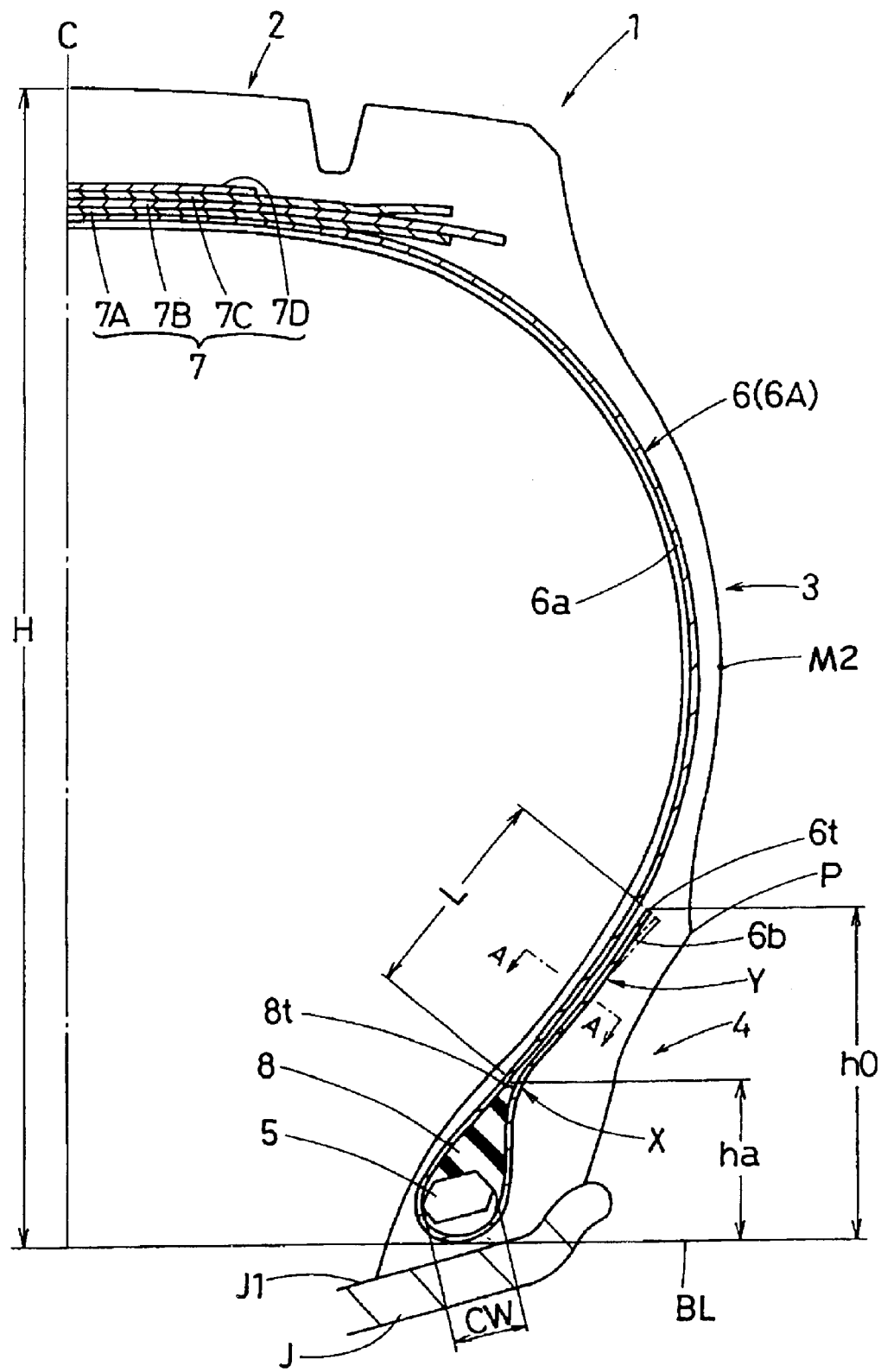
FIG. 1 is a cross sectional view of a tire according to the present invention under a standard inflated condition.

In the drawings, pneumatic tire 1 according to the present invention comprises a tread portion 2, a pair of sidewall portions 3, a pair of bead portions 4, a carcass 6 extending between the bead portions 4, and a belt 7 disposed radially outside the carcass 6 in the tread portion 2.

In this embodiment, the tire 1 is a heavy duty radial tire for trucks and buses to be mounted on a center-drop 15-degree-taper rim J.

The carcass 6 comprises at least one ply 6A of cords 6c arranged radially at an angle of from 70 to 90 degrees with respect to the tire equator C, and extending between the bead portions 4 through the tread portion 2 and sidewall portions 3, and turned up around the bead cores 5 from the axially inside to the axially outside of the tire so as to form a pair of turnup portions 6b and a main portion 6a therebetween. The carcass ply 6A is rubberized with a topping rubber 6g whose 100% modulus is preferably in a range of from 3628 to 4610 kPa. For the carcass cords 6c, steel cords and organic fiber cords, e.g. nylon, rayon, polyester, aromatic polyamide and the like can be used depending on the use of the tire. The carcass 6 in this embodiment is composed of a single ply 6A of steel cords 6c arranged radially at an angle of 90 degrees with respect to the tire equator C.

The belt 7 comprises at least two cross plies (breaker) and optionally a band.

In this embodiment, the belt 7 includes four breaker plies: a radially innermost ply 7A of parallel steel cords laid at an angle of from 50 to 70 degrees with respect to the tire equator C; and second, third and fourth plies 7B, 7C and 7D of parallel steel cords laid at small angles of not more than 30 degrees with respect to the tire equator C. For the belt cords, organic cords, e.g. nylon, rayon, aromatic polyamide, and the like can be used aside from steel cords.

Each bead portion 4 is provided between the carcass ply main portion 6a and turnup portion 6b with a rubber bead apex 8 extending and tapering radially outwardly from the bead core 5. Preferably, the bead apex 8 has a hardness of from 60 to 99 (JIS-K6253, Type-A durometer hardness).

The bead core 5 in this example is made of a steel wire wound into a flat-hexagonal sectional shape. Aside from steel wire, for example, high modulus organic cords such as aromatic polyamide cord can be used.

FIG. 1 shows the tire 1 under the standard inflated condition.

The height (ha) of the radially outer end 8t of the bead apex 8 from the bead base line BL is set in the range of from 6 to 31%, preferably 8 to 22%, more preferably 8 to 14% of the tire section height H. (in this example, about 14%).

The carcass ply turnup portion 6b extends radially outwardly along the axially outer surface 8o of the bead apex 8 and beyond the outer end 8t of the bead apex 8 so as to adjoin the main portion 6a.

In this adjoining part X where the carcass cords in the turnup portion 6b adjoin those in the main portion 6a, the distance (t) between the carcass cords in the turnup portion 6b and those in the main portion 6a is set in the range of from 0.15 to 7.0 times, preferably 0.15 to 5.0 times, more preferably 0.5 to 3.5 times, still more preferably 0.8 to 2.5 times the diameter D of the carcass cords.

The adjoining part X preferably includes a parallel part Y extending substantially parallel to the main portion 6a. Thus the distance (t) is substantially constant. The length L of the parallel part Y is set in the range of from 0.5 to 5.0 times, preferably 1.0 to 4.0 times, more preferably 2.0 to 4.0 times the maximum section width CW of the bead core 5. The maximum section width CW occurs in a direction substantially parallel to the bead bottom when the tire is mounted on the rim. The cross sectional shape of the bead core is so determined. The parallel part Y can be extended to the outer end 6t of the turnup portion 6b. But, it is also possible to make a widening part radially outside the parallel part Y as shown in FIG. 1 by an imaginary line. In the widening part, the distance (t) gradually increases towards the radially outer end 6t.

Figure 2:
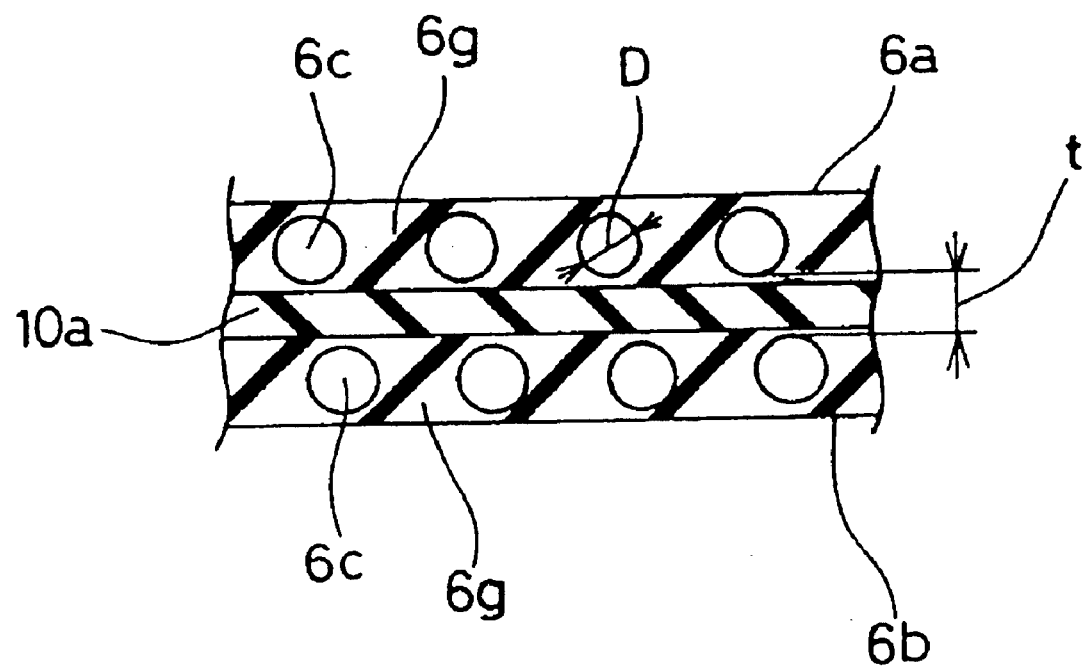
FIG. 2 is a cross sectional view taken along a line A—A of FIG. 1.

As to the rubber material between the carcass cords 6c in the main portion 6a and those in the turnup portion 6b, the topping rubber of the carcass ply 6a can be utilized. But, as shown in FIG. 2, a separate rubber layer 10a disposed therebetween is also utilized. For such rubber layer 10a, a rubber having the substantially same hardness as the topping rubber is usually used.

Figure 3:
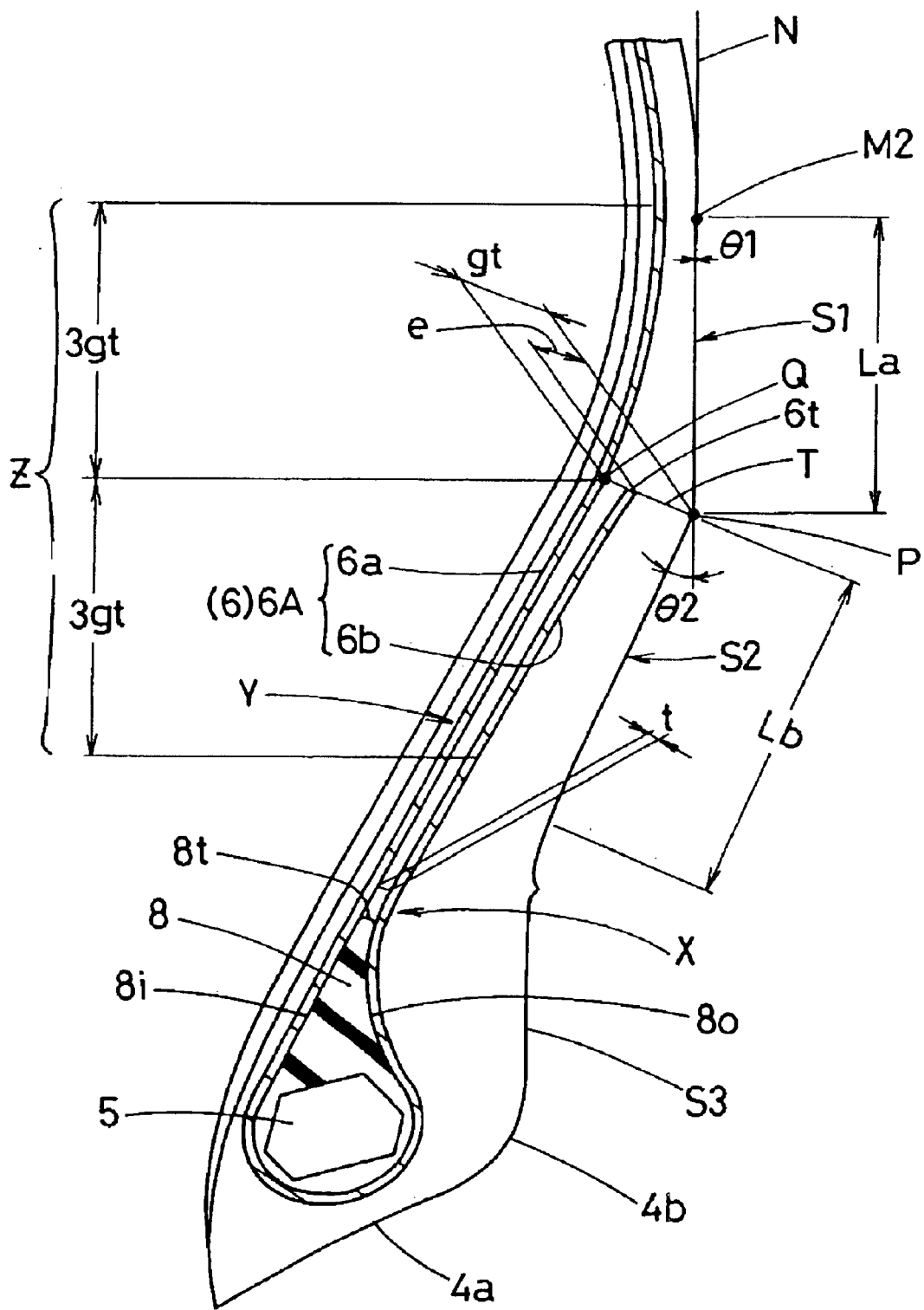
FIG. 3 is a cross sectional view of the bead portion under a standard free condition.

FIG. 3 shows the bead portion and sidewall lower portion under the standard free condition.

In a meridian section of the tire, as shown in FIG. 3, the contour or profile of the tire on each side of the tire comprises a first linear portion S1 and a second linear portion S2 which intersect at a point P.

This point P is, under the above-mentioned standard inflated condition (FIG. 1), positioned at a radial height in the range of from 0.15 to 0.4 times, preferably 0.20 to 0.38 times, more preferably 0.25 to 0.37 times the tire section height H, each from the bead base line BL.

Turning to the standard free condition, the first linear portion S1 is defined as extending substantially straight) from the maximum tire width point M2 to the point P in substantially parallel to the tire equatorial plane or at an inclination angle θ1 in the range of from +5 to −5 degrees with respect to the tire equatorial plane. The second linear portion S2 is also substantially straight and extends radially and axially inwardly from the point P at an inclination angle θ2 in the range of from +15 to +60 degrees, preferably +15 to +40 degrees, more preferably +20 to +35 degrees with respect to the tire equatorial plane C.

The minus sign used in connection with an inclination angle means that the object is inclined towards the axially outside when viewed radially inwards.

In the first linear portion S1, the distance from the outer surface of the tire to the carcass ply main portion 6a gradually increases towards the bead portion 4, and as a result, the carcass ply main portion 6a curves towards the axially inside.

In the second linear portion S2, the distance from the tire outer surface to the carcass ply main portion 6a is substantially constant. In other words, the second linear portion S2 is substantially parallel to the carcass ply main portion 6a. However, it is also possible to gradually increase the distance towards the bead portion 4.

In case of heavy duty radial tires, the distance (e) of the outer end 6t of the turnup portion 6b from the tire outer surface is set in the range of from 2 to 15 mm, preferably 3 to 8 mm.

In this embodiment, a third linear portion S3 is further provided on the radially inside of the second linear portion S2. The third linear portion S3 extends substantially straight to the vicinity of the bead heel 4b from the radially inner end of the second linear portion S2 in substantially parallel to the tire equatorial plane or at a small inclination angle in the range of from +5 to −5 degrees with respect to the tire equatorial plane.

The third linear portion S3 is, through the bead heel 4b (an arc portion), connected to a bead bottom portion 4a which comes into contact with the bead seat J1 of the wheel rim J.

As shown in FIG. 3, when (1) a straight line T is defined as extending from the point P to the carcass ply main portion 6a perpendicularly thereto, (2) a distance (gt) is defined as measured from the point P to the carcass ply main portion 6a (to the cords) along the straight line T, (3) a point Q is defined as an intersection at which the straight line T intersect the main portion 6a (the cords), and (4) a region Z is defined as extending radially inwardly and outwardly from the point Q by a radial distance (3gt) of 3 times the distance (gt), the radially outer end 6t of the turnup portion 6b is positioned within such region Z. In other words, the radial distance of the radially outer end 6t of the turnup portion 6b from the point Q is set in the range of not more than 3 times the distance (gt). Preferably, it is less than 2 times, more preferably less than 1 times, still more preferably less than 0.5 times the distance (gt). In this example, the end 6t is on the straight line T and the radial distance is almost zero.

The length La of the first linear portion S1 is set in the range of from 0.05 to 0.4 times, preferably 0.10 to 0.25 times the tire section height H.

The length Lb of the second linear portion S2 is get in the range of from 0.05 to 0.5 times, preferably 0.05 to 0.35 times the tire section height H.

If the end 6t is outside radially inward of, the region Z, the reinforcing effect by the turnup portion becomes insufficient and the bending rigidity of the bead portion decreases. When the end 6t of the turnup portion 6b is outside, radially outward of, the region Z and if the sidewall rubber outside the end 6t is relatively thin, then sidewall rubber cracks and ply edge loose are liable to occur.

On the other hand, the above-mentioned bead apex 8 has the axially outer surface 8o which is concavely curved, and the carcass ply turnup portion extends therealong. The axially inner surface 8i of the bead apex 8 along which the carcass ply main portion extends is however substantially straight. Therefore, from the axially inside of the bead core to the point Q at least, the carcass ply main portion is substantially straight.

As to the profile under the standard inflated condition (FIG. 1), as the tire is inflated, the first linear portion S1 and second linear portion S2 which are substantially straight under the standard free condition become concave slightly to have large radii. This means that a tensile strain does not occur on the tire outer surface.

Figure 4:
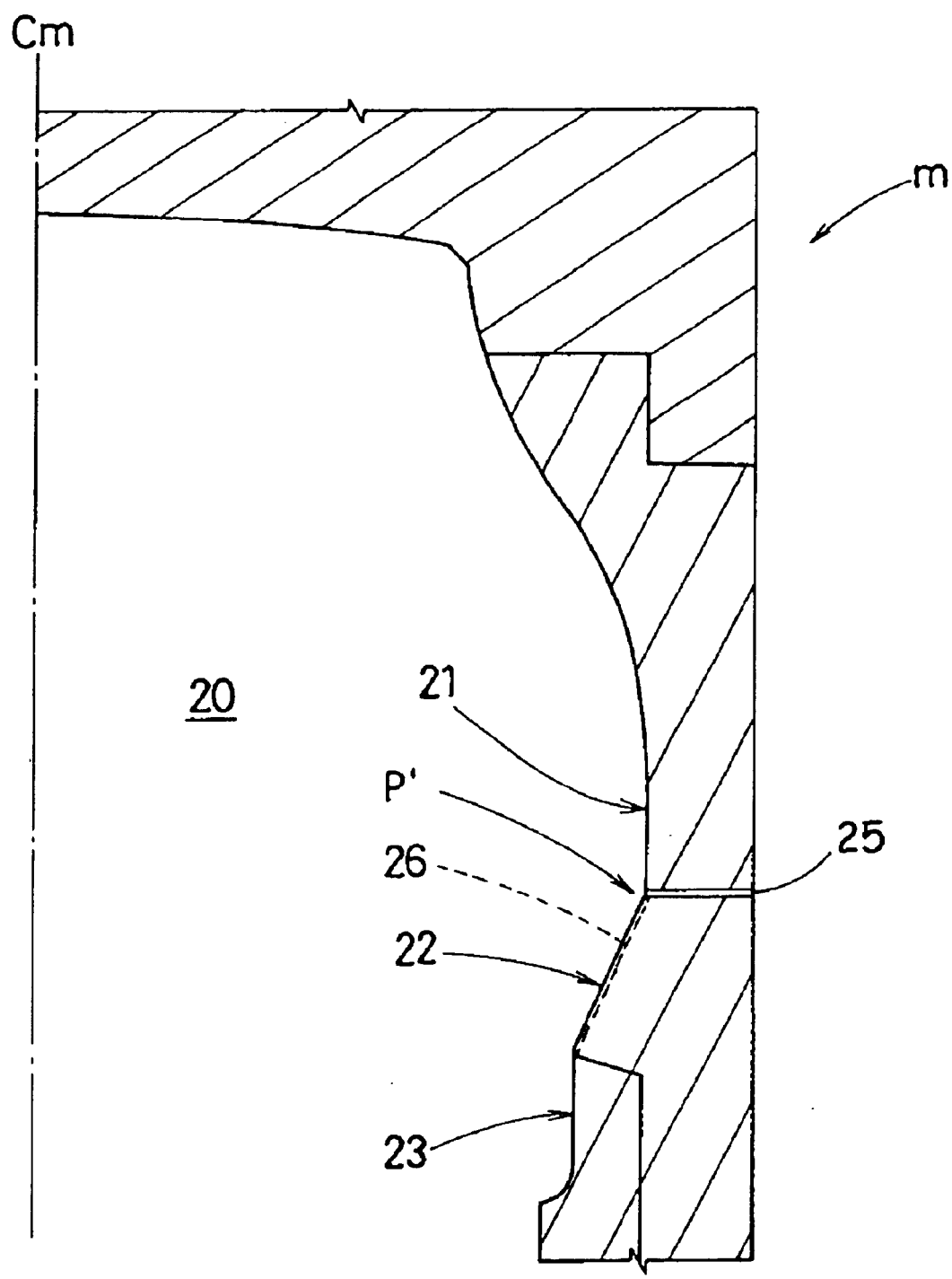
FIG. 4 is a cross sectional view of a mold for the tire.

The above-mentioned pneumatic tire is vulcanized in a mold (m) as usual. But, as shown in FIG. 4, the mold (m) has a specific profile. The inner surface of the mold (m) facing its hollow 20 is provided with a first shaping face 21, a second shaping face 22 and a third shaping face 23 for shaping the above-mentioned first linear portion S1, second linear portion S2 and third linear portion S3, respectively.

The first shaping face 21, second shaping face 22 and third shaping face 23 have the same profiles as the first linear portion S1, second linear portion S2 and third linear portion S3, respectively. In other words, the above-mentioned tire profile under the standard free condition is intended to be the profile of the tire disposed in the mold.

The first shaping face 21 extends substantially straight from a point P' corresponding to the point P towards the radially outside at the above-mentioned inclination angle θ1 in the range of from +5 to −5 degrees with respect to the equatorial plane Cm.

The second shaping face 22 extends substantially straight from the point P' towards the radially and axially inside at the above-mentioned inclination angle θ2 in the range of from +15 to +60 degrees with respect to the equatorial plane Cm.

If the angle θ1>+5 degrees, the durability has a tendency to decrease. If the angle θ1<−5 degrees, the tire weight increases. If the angle θ2>60 degrees, the rigidity of the bead portion 4 decreases and the durability tends to decrease. If the angle θ2<15 degrees, the tire weight increases.

On the other hand, the mold (m) is provided with vent holes 25 and radially-extending circumferentially-spaced vent grooves 26 to release gas trapped between the tire and mold. The vent holes 25 open to the hollow 20 in the vicinity of the point P' and extend to the outside of the mold. The vent grooves 26 has a depth and width less than 1.0 mm and are disposed in the second shaping face 22 to extend to the vicinity of the point P'.

Comparison Tests

Test tires of size 11R22.5 14PR (wheel rim size 7.50×22.5) for trucks and buses were made and tested for bead durability, ozone crack and maximum principal strain.

Common specifications of the test tires areas follow: the carcass was composed of a single ply of steel cords (3×0.2 mm+7×0.23 mm) arranged radially at an angle of 90 degrees with respect to the tire equator (cord count=38/5 cm under bead core); the belt was composed of four plies of parallel steel cords (3×0.20 mm+6×0.35 mm) laid at +67, +18, −18 and −18 degrees with respect to the tire equator (cord count=26/5 cm); the inner liner was made of 100-halogenated butyl rubber; and the radial height of the point P was about 0.3 times the tire section height H.

1) Bead Durability Test

Using a tire test drum, the test tire was run under a speed of 20 km/h, a tire load of 88200 N and a pressure of 1000 kPa until any visible damage was observed or the travel distance reached to 10,000 km. And the ratio of the marked travel distance to 10.000 km was obtained as the bead durability. The results are indicated in Table 1 by an index based on a conventional tire (Conv.) being 100. The larger the value, the better the durability.

2) Ozone Crack Test

The test tire inflated to 800 kPa was put in an ozone chamber (ozone concentration 40 pphm, temperature 40 deg. C) and time until the sidewall portion or bead portion cracked was measured. The results are indicated in Table 1 by an index based on the conventional tire being 100. The larger the value, the higher the resistance to cracks.

3) Maximum principal strain Test

On the outer surface of the tire in the bead portion and sidewall lower portion, maximum principal strain ε was measured. If the maximum principal strain is large, the outer surface is liable to crack, and further carcass ply separation is liable to occur. Thus, the maximum principal strain can be regarded as a criterion for the bead durability.

Figure 5:
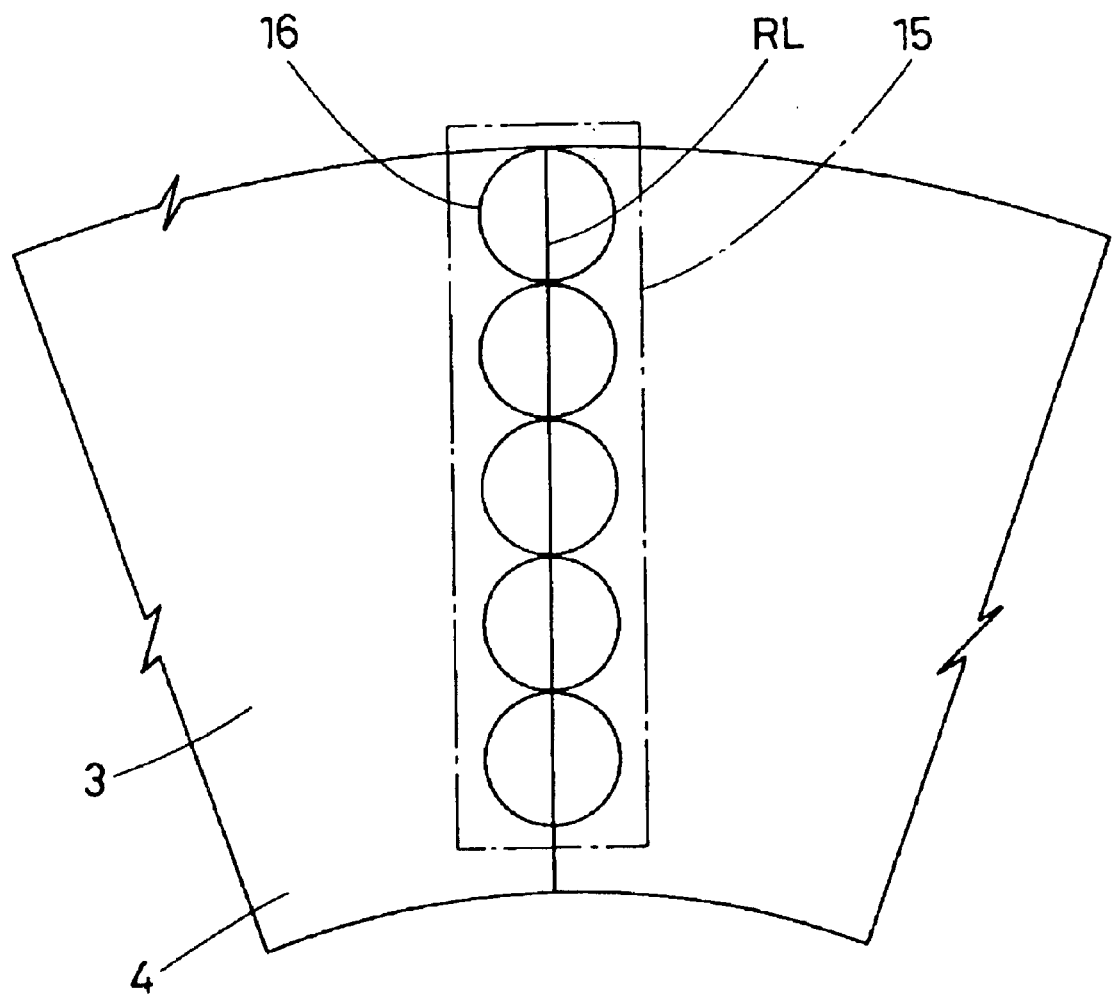

In this test, the maximum principal strain ε was measured as follows. First, the test tire is mounted on a standard rim and inflated to an inner pressure of 49 kpa. Then, as shown in. FIG. 5, a radially extending measuring reference line RL is drawn on the outer surface of the sidewall portion and bead portion. On the other hand, markings or a series of circles in white ink (titanium oxide+DOP+castor oil) are copied onto a vinyl tape 15 by means of screen printing. In order to copy the markings, the vinyl tape 15 is applied to the tire outer surface along the measuring reference line RL. Next, the tire is inflated to a normal pressure of 800 kPa. Then, the markings on the tire outer surface are copied to a blank tape. The markings (under the reference condition in which 49 kpa was applied, and the comparative condition in which the normal pressure of 800 kPa was applied) obtained as explained above, are enlarged to measure each reference point shown in FIG. 6. From the coordinates measured, the maximum principal strain can be calculated using the following equations Eq.1 to Eq.11.

Under the reference condition, circumferential length $$Lc0=\{(x10-x20)^2+(y10-y20)^2\}^{1/2} \qquad \text{Eq.1}$$

radial length $$Lr0=\{(x30-x40)^2+(y30-y40)^2\}^{1/2} \qquad \text{Eq.2}$$

length in a 135 degree direction $$L_{135}0=\{(x50-x60)^2+(y50-y60)^2\}^{1/2} \qquad \text{Eq.3}$$

Under the comparative condition, circumferential length $$Lc1=\{(x11-x21)^2+(y11-y21)^2\}^{1/2} \qquad \text{Eq.4}$$

radial length $$Lr1 = \{(x31-x41)^2 + (y31-y41)^2\}^{1/2} \quad \text{Eq.5}$$

length in a 135 degree direction $$L_{135}1 = \{(x51-x61)^2 + (y51-y61)^2\}^{1/2} \quad \text{Eq.6}$$

Circumferential strain $$\epsilon c = (Lc1 - Lc0)/Lc0 \quad \text{Eq.7}$$

Radial strain $$\epsilon r = (Lr1 - Lr0)/Lr0 \quad \text{Eq.8}$$

Strain in the 135 degree direction $$\epsilon_{135} = (Lr_{135}1 - L_{135}0)/L_{135}0 \quad \text{Eq.9}$$

Searing strain $$\tau = \epsilon c + \epsilon r - 2 \times \epsilon_{135} \quad \text{Eq.10}$$

The maximum principal strain $$\epsilon = (\epsilon c + \epsilon r)/2 + \{(\epsilon c - r)^2 + \tau^2\}^{1/2}/2 \quad \text{Eq.11}$$

From the tests, it was confirmed that the tires according to the invention can be effectively improved in the durability while decreasing the tire weight.

The present invention is suitably applied to heavy duty radial tires, but it can be also applied to passenger car tires, light truck tires, motorcycle tires and the like.

TABLE 1

| Tire | Ref.1 | Ref.2 | Ref.3 | Ref.4 | Ref.5 | Ref.6 | Ref.7 | Ref.8 |
|---|---|---|---|---|---|---|---|---|
| Bead apex | | | | | | | | |
| Height ha (mm) | 30 | 30 | 30 | 30 | 30 | 30 | 30 | 30 |
| ha/H (*1) | 0.14 | 0.14 | 0.14 | 0.14 | 0.14 | 0.14 | 0.14 | 0.14 |
| Carcass ply | | | | | | | | |
| Turnup height hO (mm) | 75 | 75 | 75 | 75 | 115 | 30 | 75 | 75 |
| hO/H (*1) | 0.35 | 0.35 | 0.35 | 0.35 | 0.53 | 0.14 | 0.35 | 0.35 |
| Parallel part | | | | | | | | |
| Length L (mm) | 53 | 53 | 53 | 53 | 93 | 10 | 53 | 53 |
| t/D | 4 | 4 | 4 | 4 | 4 | 4 | 4 | 4 |
| L/CW (*2) | 3.5 | 3.5 | 3.5 | 3.5 | 6.2 | 0.7 | 3.5 | 3.5 |
| Profile | FIG. 8 | FIG. 9 | FIG. 3 base | FIG. 3 base | FIG. 3 base | FIG. 3 base | FIG. 10 | FIG. 11 |
| First linear portion S1 | none convex | none concave | none straight | none straight | present straight | present straight | present straight | present straight |
| Angle θ1 (deg.) (*3) | | | 6 | −6 | 0 | 0 | 0 | 0 |
| La/H | 0 | 0 | 0.2 | 0.2 | 0.2 | 0.2 | 0.2 | 0.2 |
| Second linear portion S2 | present straight | present straight | present straight | present straight | present straight | present straight | none convex | none concave |
| Angle θ2 (deg.) (*3) | 25 | 25 | 25 | 25 | 25 | 25 | | |
| Lb/H | 0.17 | 0.17 | 0.17 | 0.17 | 0.17 | 0.17 | 0 | 0 |
| Distance (gt) (mm) | 6 | 15 | 16 | 5 | 10 | 10 | 10 | 10 |
| Distance (e) (mm) | 2.5 | 10 | 11 | 1.5 | 1.5 | 16 | 5 | 5 |
| Distance between Turnup end and Q (*4) | 0 | 0 | 0 | 0 | 4 gt | 4 gt | 0 | 0 |
| Maximum principal strain (%) | 3.8 | 3.8 | 4.2 | 4 | 4 | 2 | 2.7 | 3.5 |
| Tire weight (index) | 101 | 103 | 125 | 98 | 102 | 70 | 103 | 100 |
| Bead durability (index) | 98 | 104 | 104 | 95 | 96 | 87 | 98 | 100 |
| Crack resistance (index) | 95 | 95 | 93 | 94 | 94 | 100 | 99 | 97 |

| Tire | Ref.9 | Ref.10 | Ex.1 | Ex.2 | Ex.3 | Ex.4 | Ex.5 | Conv. |
|---|---|---|---|---|---|---|---|---|
| Bead apex | | | | | | | | |
| Height ha (mm) | 30 | 30 | 30 | 30 | 30 | 30 | 30 | 30 |
| ha/H (*1) | 0.14 | 0.14 | 0.14 | 0.14 | 0.14 | 0.14 | 0.14 | 0.14 |
| Carcass ply | | | | | | | | |
| Turnup height hO (mm) | 75 | 75 | 75 | 75 | 75 | 75 | 75 | 75 |
| hO/H (*1) | 0.35 | 0.35 | 0.35 | 0.35 | 0.35 | 0.35 | 0.35 | 0.35 |
| Parallel part | | | | | | | | |
| Length L (mm) | 53 | 53 | 53 | 53 | 53 | 53 | 53 | 53 |
| t/D | 4 | 4 | 4 | 4 | 4 | 4 | 4 | 4 |
| L/CW (*2) | 3.5 | 3.5 | 3.5 | 3.5 | 3.5 | 3.5 | 3.5 | 3.5 |
| Profile | FIG. 3 base | FIG. 3 base | FIG. 3 | FIG. 3 | FIG. 3 | FIG. 3 | FIG. 3 | FIG. 7 |
| First linear portion S1 | present straight | present straight | present straight | present straight | present straight | present straight | present straight | none convex |
| Angle θ1 (deg.) (*3) | 0 | 0 | 0 | 0 | 0 | 5 | −5 | |
| La/H | 0.2 | 0.2 | 0.2 | 0.2 | 0.2 | 0.2 | 0.2 | 0 |
| Second linear portion S2 | none straight | none straight | present straight | present straight | present straight | present straight | present straight | none convex |
| Angle θ2 (deg.) (*3) | 14 | 61 | 25 | 15 | 50 | 25 | 25 | |
| Lb/H | 0 | 0 | 0.17 | 0.18 | 0.15 | 0.17 | 0.17 | 0 |

TABLE 1-continued

| | | | | | | | | |
|---|---|---|---|---|---|---|---|---|
| Distance (gt) (mm) | 10 | 10 | 10 | 10 | 10 | 12 | 8 | 13 |
| Distance (e) (mm) | 5 | 5 | 5 | 5 | 5 | 6.5 | 3.5 | 7.5 |
| Distance between Turnup end and Q (*4) | 0 | 0 | 0 | 0 | 0 | 0 | 0 | 0 |
| Maximum principal strain (%) | 3 | 4 | 2 | 2.5 | 2.9 | 2.1 | 2.2 | 2 |
| Tire weight (index) | 99 | 96 | 97 | 98 | 96 | 99 | 98 | 100 |
| Bead durability (index) | 102 | 103 | 130 | 105 | 120 | 130 | 130 | 100 |
| Crack resistance (index) | 96 | 94 | 100 | 100 | 100 | 100 | 100 | 100 |

(*1) H = 215 mm
(*2) CW = 15 mm
(*3) Minus sign means that it inclined axially outwards when viewed towards the radially inside.
(*4) Minus sign means that the turnup end was radially inwards of the point Q.

What is claimed is:

1. A pneumatic tire comprising
a tread portion,
a pair of sidewall portions,
a pair of bead portions each with a bead core therein,
a carcass ply of cords extending between the bead portions through the tread portion and sidewall portions and turned up around the bead core in each bead portion from the axially inside to the outside of the tire to form a pair of turnup portions and a main portion therebetween,
a radially outwardly tapering rubber bead apex disposed between each of the turnup portions and the main portion,
each of the turnup portions extending radially outwardly beyond a radially outer end of the bead apex to form an adjoining part in which carcass cords in the turnup portion adjoin carcass cords in the main portion,
in a meridian section of the tire, the sidewall portion and bead portion on each side of the tire having a profile comprising a first linear portion and a second linear portion each being substantially straight,
said first linear portion extending radially outwards from a point P in substantially parallel to the tire equatorial plane,
said second linear portion extending radially inwards from said point P while inclining axially inwards at an angle of from +15 to +60 degrees with respect to the tire equatorial plane,
a radially outer end of each of the turnup portions being disposed at a radial distance from a point Q which radial distance is in a range of less than 0.5 times a distance (gt) wherein the distance (gt) is defined as measured from said point P to the carcass ply main portion along a straight line drawn from the point P perpendicularly to the carcass ply main portion, and the point Q is defined as a point at which said straight line intersects the carcass ply main portion, and wherein said adjoining part extends radially inwardly beyond the radically inner end of the second linear portion.

2. The pneumatic tire according to claim 1, wherein when the tire is mounted on a standard wheel rim and inflated to a standard pressure but loaded with no tire load, the point P is positioned at a height in a range of from 0.15 to 0.4 times the section height H of the tire, each from a bead base line.

3. The pneumatic tire according to claim 1, wherein the length of the fist linear portion is in a range of from 0.05 to 0.4 times the tire section height H, and
the length of the second linear portion is in a range of from 0.05 to 0.5 times the tire section height H.

4. The pneumatic tire according to claim 1, wherein said profile comprises a third linear portion extending substantially straight from the radially inner end of the second linear portion to the vicinity of a bead heel in substantially parallel to the tire equatorial plane.

5. The pneumatic tire according to claim 1, wherein in said adjoining part, the distance (t) between the carcass cords of the turnup portion and the carcass cords in the main portion is in a range of from 0.15 to 7.0 times diameter D of the carcass cords, and
said adjoining part includes a parallel part in which the distance (t) is substantially constant.

6. The pneumatic tire according to claim 1, wherein in said adjoining part, the distance (t) between the carcass cords of the turnup portion and the carcass cords in the main portion is in a range of from 0.15 to 7.0 times the diameter D of the carcass cords, and
said adjoining part includes a widening part in which the distance (t) gradually increases towards the radially outer end of the adjoining part.

7. The pneumatic tire according to claim 5, wherein a radial height (ha) of the radially outer end of the bead apex is in a range of from 6 to 41% of the tire section height H.

8. A pneumatic tire comprising
a tread portion,
a pair of sidewall portions,
a pair of bead portions each with a bead core therein,
a carcass ply of cords extending between the bead portions through the tread portion and sidewall portions and turned up around the bead core in each bead portion from the axially inside to the outside of the tire to form a pair of turnup portions and a main portion therebetween,
a radially outwardly tapering rubber bead apex disposed between each of the turnup portions and the main portion,
each of the turnup portions extending radially outwardly beyond a radially outer end of the bead apex to form an adjoining part in which carcass cords in the turnup portion adjoin carcass cords in the main portion,
in a meridian section of the tire, the sidewall portion and bead portion on each side of the tire having a profile comprising a first linear portion and a second linear portion each being substantially straight,
said first linear portion extending radially outwards from a point P in substantially parallel to the tire equatorial plane,
said second linear portion extending radially inwards from said point P while inclining axially inwards at an angle of from +15 to +60 degrees with respect to the tire equatorial plane, a radially outer end of each of the turnup portions being disposed at a radial distance from a point Q which radial distance is in a range of less than 0.5 times a distance (gt) wherein the distance (gt) is defined as measured from said point P to the carcass ply main portion along a straight line drawn from the point P perpendicularly to the carcass ply main portion, and the point Q is defined as a point at which said straight line intersects the carcass ply main portion, and when the tire is mounted on a standard wheel rim and inflated to a standard pressure, but loaded with no tire load, said first linear portion and said second linear portion are slightly curved concavely.

* * * * *